United States Patent [19]

Strain, Jr.

[11] 4,441,452

[45] Apr. 10, 1984

[54] METHOD AND APPARATUS FOR AERATING FISH PONDS

[76] Inventor: Ernest D. Strain, Jr., P.O. Box 1578, Greenwood, Miss. 38930

[21] Appl. No.: 341,308

[22] Filed: Jan. 21, 1982

[51] Int. Cl.³ ............................................. A01K 61/00
[52] U.S. Cl. ............................................ 119/3; 261/92
[58] Field of Search ............. 119/3; 261/91, 92, 34 R, 261/84, DIG. 79

[56] References Cited

U.S. PATENT DOCUMENTS

| | | | |
|---|---|---|---|
| 2,751,881 | 6/1956 | Burkey | 119/3 |
| 2,791,406 | 5/1957 | Bates | 415/182 |
| 2,860,600 | 11/1958 | Cheney | 119/3 |
| 3,217,654 | 11/1965 | Springer | 415/219 C |
| 3,958,895 | 5/1976 | Brisson | 415/219 C |
| 4,085,171 | 4/1978 | Baker et al. | 261/36 R |

*Primary Examiner*—Hugh R. Chamblee
*Attorney, Agent, or Firm*—James L. Bean

[57] ABSTRACT

An improved apparatus for and method of aerating fish ponds utilizes a portable, wheel mounted, tractor drawn and driven pumping apparatus adapted to be backed into a pond to submerge the pump intake with the tractor remaining on the bank adjacent the water's edge. The pump is driven from the tractor power take-off to deliver a high volume, relatively low-pressure water output to a discharge manifold adapted to discharge the water in two opposed streams generally parallel to the bank of the pond and to simultaneously discharge water in an upward direction as a spray to absorb oxygen from the atmosphere before falling back into the pond. The apparatus can be easily moved and quickly positioned for emergency operation to aerate a pond and prevent fish, searching for oxygen in the shallow water at the edge of the pond, from beaching themselves and dying.

6 Claims, 6 Drawing Figures

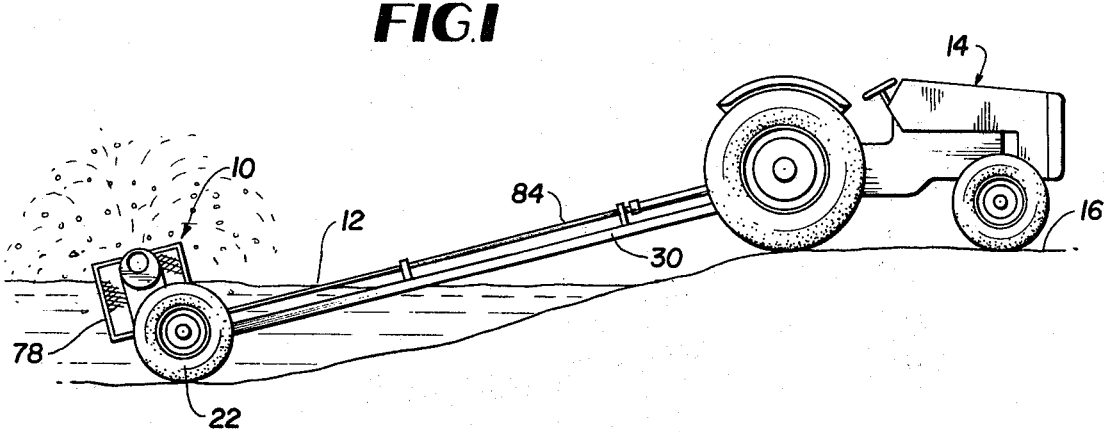
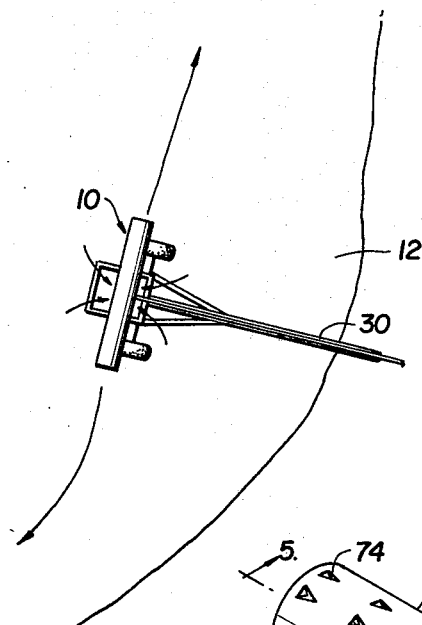
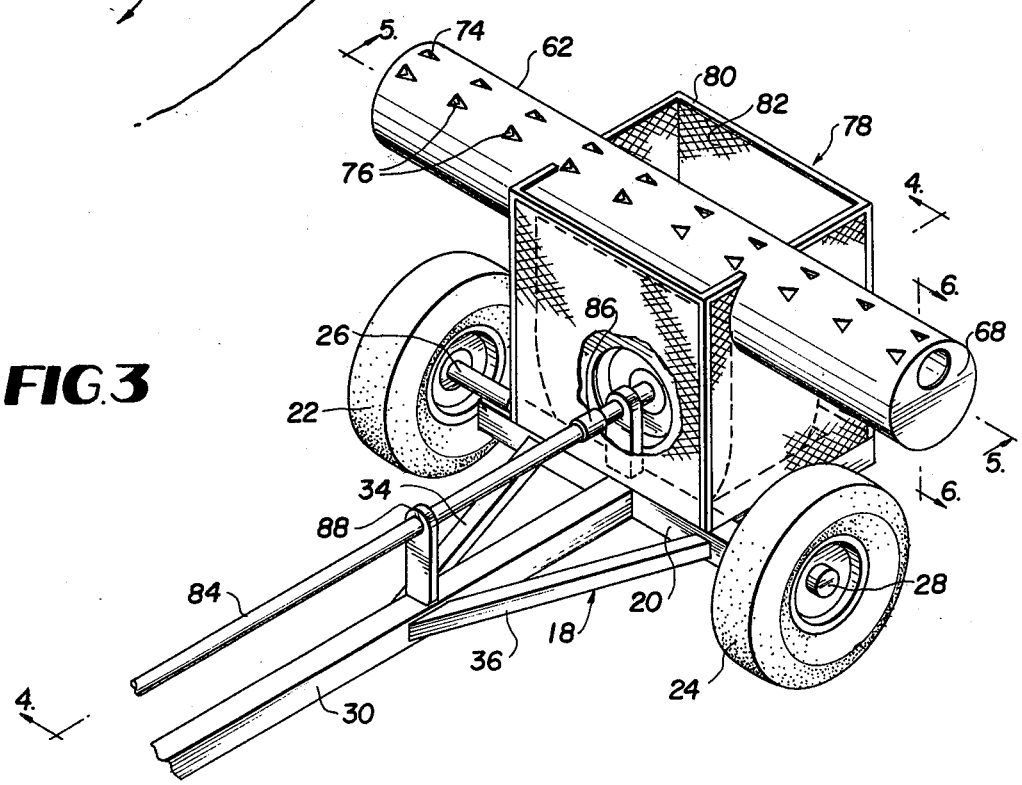

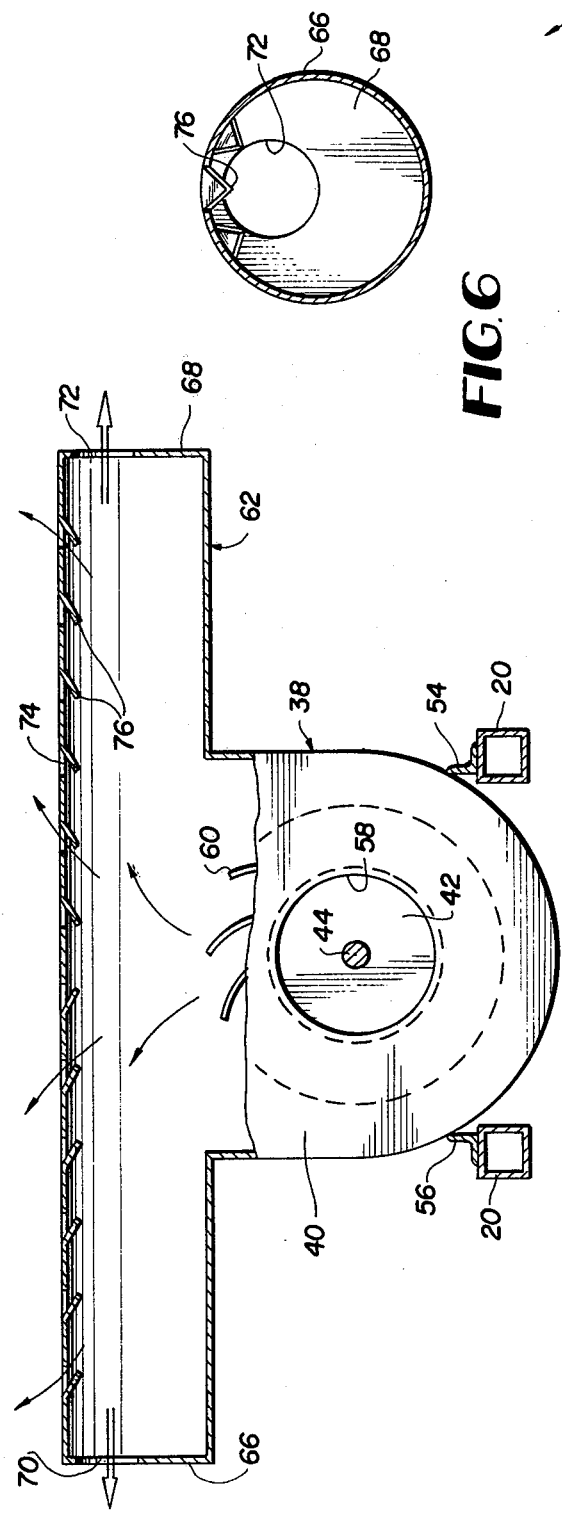
FIG.5
FIG.6
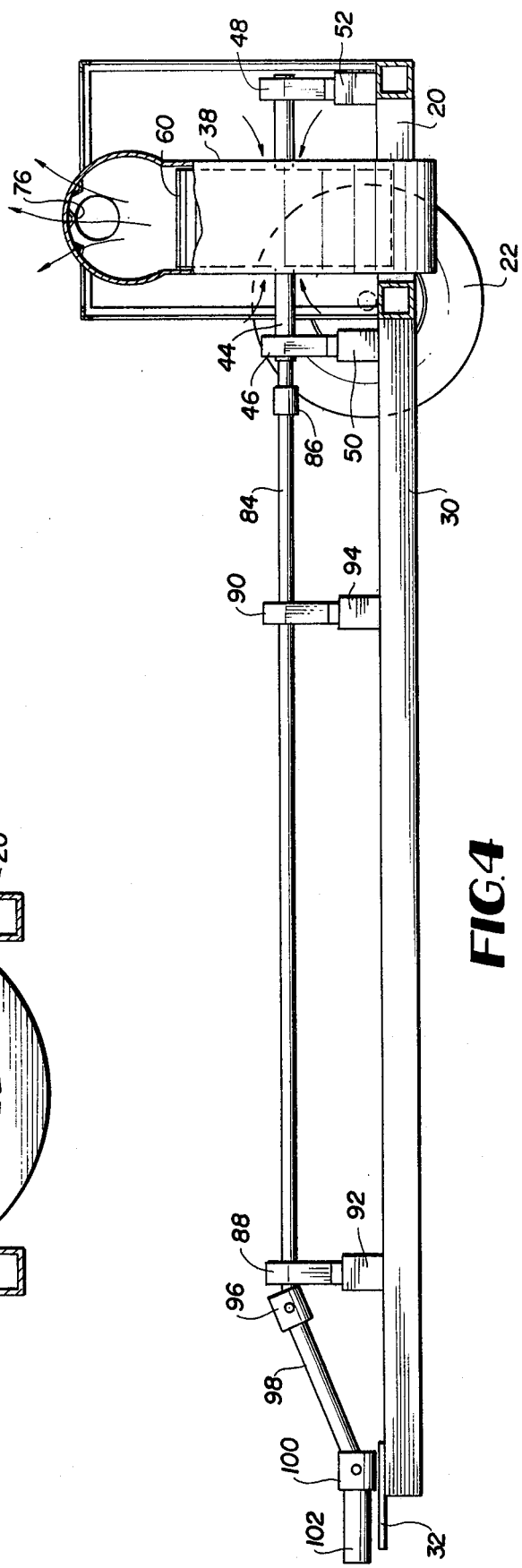
FIG.4

METHOD AND APPARATUS FOR AERATING FISH PONDS

BACKGROUND OF THE INVENTION

1. Field of the Invention

This invention relates to an apparatus for and method of aerating water in a reservoir or pond and more particularly to an improved apparatus for and method of aerating fish ponds to simultaneously replenish dissolved oxygen in the water and to move fish from the shallow water at the edge of the pond.

2. Description of the Prior Art

Fish farming has become an important source of food and other products and is widely practiced, particularly in the temperate climate areas of the world such as found in the Southern regions of the United States where catfish farming, for example, is a rapidly growing industry. In catfish farming as currently practiced, the majority of the fish are raised in large ponds created by flooding fields which may be from one or two to twenty acres or more in size. Thus, each pond will normally contain a large number of fish and represent a very substantial investment.

Such catfish farming is normally practiced in relatively level terrain so that a large field can be flooded without requiring excessive landscaping to construct the banks, and without requiring excessive water to flood the field. Conserving water is particularly important in areas where the water must be pumped from underground wells, and the ponds generally are relatively shallow. While such large, shallow ponds are well suited for growing catfish, the dissolved oxygen in the water may become rapidly depleted under certain conditions. The conditions leading to depletion of available oxygen are generally well-known to the experienced fish farmer so that the farmer can monitor the ponds and take emergency action when necessary to aerate the water and avoid fish loss.

When the oxygen level in a fish pond becomes dangerously low, the fish tend to migrate to the shallow water adjacent the edges of the pond seeking the higher levels of oxygen resulting from aeration produced by any wave action along the banks. Unless action is quickly taken, the large concentration of fish in the shallow water may actually reduce the available oxygen and often results in the fish beaching themselves and dying. Thus, the migration of fish to the edges of the pond becomes a signal to the farmer that emergency action is required. This emergency action involves not only aeration of the pond water but also driving the fish from the edges of the pond.

Various methods have been used in the past to aerate fish ponds, one known method involving use of a pump to discharge a stream or jet of water into the air where it absorbs oxygen before falling back into the pond. This also creates turbulence in the pond, again facilitating the absorption of oxygen from the atmosphere. The pump may be fixed or portable and may take suction directly from the pond or from an alternative source such as from a well.

It is also known to use mechanical agitation or aeration devices which may be moved into the pond to agitate the water. For example, a pair of paddle wheels have been mounted on a trailer or cart which could be positioned in the water, with the paddle wheels being driven through a differential drive system from a suitable power means to both agitate and aerate the water in the vicinity of the wheels and to create a current in the pond moving away from the bank in the vicinity of the aeration apparatus.

It is also known to direct a stream of water into the shallow water portion of a pond adjacent the banks to drive fish away from the banks. This generally has been accomplished by use of pumps as generally described above.

SUMMARY OF THE INVENTION

While it has long been known to provide emergency aeration of water in a fish pond, the previously used methods and devices have not proven entirely satisfactory. For example, the known devices generally have not been effective both in aeration of the pond water and in driving fish from the shallow areas adjacent the bank. Further, the known aeration devices have frequently been relatively inefficient and often could not provide emergency aeration quickly enough to avoid substantial fish loss. Accordingly, it is a primary object of the present invention to provide an improved fish pond aeration apparatus which will be effective both in aerating the pond water and in driving fish from the shallow water areas at the edge of the pond.

Another object of the invention is to provide such a fish pond aeration apparatus which is highly portable, easily and reliably operated, and requires no special installation.

Another object of the invention is to provide such an apparatus which may be readily connected to a conventional farm tractor for movement to a point of use, and driven by the tractor to enable the fish farmer to provide rapid emergency aeration at any point around a fish pond.

Another object of the invention is to provide such an apparatus which is more effective in driving fish from the shallow water edges of the pond than the known prior art devices.

The foregoing and other objects and advantages of the invention are achieved in an aeration apparatus in which a suitable pump is mounted on a wheeled carriage or trailer adapted to be quickly and easily connected to the drawbar of a conventional farm tractor for easy movement to the point of use. The pump preferably includes a drive shaft adapted to be connected to the tractor power take-off for operation. The pump drive shaft and trailer support structure are such that the pump is located a substantial distance from the tractor pulling the trailer thereby the trailer may be backed into the edge of a pond to submerge the pump inlet with the tractor remaining on the bank. A manifold supported on the trailer is connected to the pump outlet, and two discharge openings are provided in the manifold in position to discharge streams of water in substantially opposite directions and generally perpendicular to the direction of movement of the apparatus when being pulled by a tractor. Thus, the streams of water are discharged generally parallel to the edge of the pond, one in each direction away from the pump. These streams, which together preferably constitute a major portion of the pump output, act both to aerate the water and to create currents along the edge of the pond tending to drive the fish away from the shallow water adjacent the edge of the pond.

The pump manifold is preferably an elongated pipe-like structure, with the two primary discharge openings being locate one in each end of the manifold. Also, a plurality of smaller, or secondary discharge openings may be formed in the top portion of the manifold, preferably substantially throughout its length, with the secondary openings being designed to discharge an upwardly and outwardly diverging spray of water which absorbs substantial oxygen from the atmosphere before falling into the pond and creating turbulence which again facilitates aeration.

The pump is preferably driven by an elongated shaft having one end directly connected to the pump rotor and its other end adapted to be connected, through a universal splined coupling, directly to the tractor power take-off. Thus, the tractor employed to move the apparatus into position can be used to drive the pump, thereby maintaining the cost of the apparatus at a minimum. A large shield, or screen is provided around the pump inlet to prevent fish from being drawn into the apparatus.

BRIEF DESCRIPTION OF THE DRAWINGS

Other objects and advantages of the invention will become apparent from the detailed description contained herein below, taken in conjunction with the drawings, in which:

FIG. 1 is a schematic view, in elevation, illustrating the apparatus in use to aerate a pond;

FIG. 2 is a top plan view of the apparatus shown in FIG. 1;

FIG. 3 is an enlarged, isometric view of the pumping apparatus shown in FIG. 1;

FIG. 4 is a sectional view taken along line 4—4 of FIG. 3;

FIG. 5 is an enlarged fragmentary sectional view taken along line 5—5 of FIG. 3; and FIG. 6 is an enlarged sectional view taken along ine 6—6 of FIG. 3.

DESCRIPTION OF THE PREFERRED EMBODIMENTS

Referrring now to the drawings in detail, the pond aerating apparatus according to the present invention is designated generally by reference numeral 10 and is illustrated in FIG. 1 in use in a pond 12 and being driven by a conventional farm tractor 14 parked on the bank 16 adjacent the water's edge. The aerator 10 includes a support trailer assembly 18 including a rigid, substantially rectangular frame 20 supported for movement over the ground by a pair of wheels 22, 24 mounted on axles 26, 28, respectively, rigidly joined to and projecting laterally from frame 20 along a common straight line. An elongated coupling member, or tongue 30 has one end rigidly connected to frame 20 and its other end projecting forwardly therefrom to be connected, through a suitable coupling plate 32, to the drawbar (not shown) of tractor 14. A pair of angle brace members 34, 36 reinforce the connection between the tongue 30 and frame 20.

A suitable pump indicated generally at 38 is mounted on frame 20 and includes a housing 38 having an impeller 42 mounted for rotation therein by shaft 44 and journal bearings 46, 48. Bearings 46, 48 are supported on pillow blocks 50, 52, respectively, mounted on frame 20. Suitable means, such as angle bracket 54, 56 rigidly mount the pump housing on frame 20, as illustrated in FIG. 5. A central, axial opening 58 in housing 40 provides an inlet for the pump and if desired a second such inlet may be provided on the opposite side of housing 36.

The pump employed in the apparatus is illustrated only schematically in the drawings and may be any of a number of commercially available pumps, preferably of the centrifugal type capable of delivering a high volume output at moderate discharge pressures. Such pumps may have a central, axial inlet, with radially extending vanes 60 on the impeller 42 propelling the water toward the periphery of the housing 40 for discharge into an elongated, relatively large diameter manifold 62. As best seen in FIG. 5, manifold 62 may be mounted directly on the top portion of housing 40, with the outlet of housing 40 opening directly into the manifold. Thus, operation of the pump by driving the impeller clockwise as seen in FIG. 5 will draw water through the inlet 58 when the pump is submerged below the inlet, and discharge the water into the manifold.

Manifold 62 includes an elongated body section preferably constructed of a length of cylindrical pipe 64 having end plates 66, 68 rigidly fixed, as by welding, in its opposed ends, and having its central portion rigidly joined to and opening into the pump housing 38. End plates 66, 68, respectively, have primary outlet openings 70, 72, respectively, formed in their upper section to provide the primary outlet openings for pressurized water from within the manifold. A plurality of secondary outlet openings 74 are formed in the top wall portion of the manifold cylindrical body. Each secondary outlet 74 may be formed by making a substantially V-shaped cut, as by a stamping or die-cutting operation, through the body wall and deforming the resulting generally triangular tab, or tang, 76 inwardly into the manifold body.

The extent to which the tabs 76 are deflected inwardly will influence the effective size of and consequently the volume of water which may be discharged through the secondary outlet openings. Also, the shape of the openings results in water discharged through each opening being broken up into droplets, or a spray pattern rather than being discharged in a solid stream. Thus, the pattern defined by the plurality of secondary openings 74 produces an upwardly and outwardly directed spray capable of absorbing substantial amounts of oxygen from the atmosphere before the water falls back into the pond. At the same time, water is being discharged in a more solid stream, or jet, from each of the primary outlet openings, with the two streams being directed in opposition to one another so that any reaction force is cancelled. The two primary streams are discharged in a substantially horizontal direction and in a vertical plane generally parallel to axles 26, 28 and perpendicular to the carriage tongue 30.

In order to avoid drawing fish from the surrounding pond water into the pump during operation of the aeration apparatus, an open screen box, or cage 78 is mounted on frame 20 surrounding the pump housing in outwardly spaced relation to the inlet or inlets 58. Screen box 78 comprises a generally rectangular, open frame 80 constructed of relatively lightweight steel angle members and panels extending between the frame members constructed from an open mesh screen such as an expanded sheet metal screen indicated generally at 82. While some very small fish may be drawn through the open mesh, there is a tendency for fish to swim against a current so that, if they approach the aerator so closely as to sense the current flowing toward the pump inlet, the natural tendency is to head into and swim away from this current. Larger fish that inadvertently swim too close to the inlet can escape since the current surrounding the relatively large screen box is relatively slow.

The pump impeller 42 is preferably driven from a conventional power take-off shaft from the tractor 14. To this end, an elongated drive shaft 84 has one end connected, as by coupling 86, to the impeller shaft 44. Shaft 84 is supported by a pair of journal bearings 88, 90 mounted, by pillow blocks 92, 94, respectively, on tongue 30. A flexible or universal shaft coupling mechanism is connected to the other end of shaft 84, and comprises a first universal joint 96 connected between the end of shaft 84 and second, relatively short shaft member 98, and a second universal coupling 100 connected between the shaft member 98 and a splined coupling sleeve 102 adapted to telescopingly receive the conventional splined power take-off shaft of a tractor. This drive arrangement permits relative misalignment of the tractor and aeration apparatus in a manner conventional in equipment driven from a tractor power take-off.

When it is determined that emergency aeration is required, the aeration apparatus just described may be quickly connected to a conventional farm tractor by connecting the universal drive shaft assembly to the tractor's power take-off and connecting the tongue to the tractor's drawbar, through the coupling plate 32, by use of a simple coupling pin, not shown. The apparatus may be then rapidly moved to the point where aeration is required, and backed into the pond water with the tongue of the apparatus extending generally perpendicular to the shoreline and with the farm tractor 14 remaining on the bank adjacent the water's edge. The relatively long tongue enables the aeration apparatus to be backed into the water a substantial distance, if necessary, to submerge the pump inlet while leaving the pump manifold above the surface of the pond, as illustrated in FIG. 1. Aeration of the pond commences immediately since no time is lost in starting auxiliary power equipment. Preferably, the aeration apparatus is positioned so that the primary outlets 70, 72 are only a short distance above the water surface to minimize head loss, although it should be recognized that the pump housing and/or manifold structure can readily be constructed to provide a greater elevation of the manifold and primary pump outlets, where desired in order to obtain a primary water discharge in streams which project a greater distance away from the aeration apparatus.

With the aeration apparatus positioned as described, operation of the pump will project two streams from the primary outlet openings, one in each direction from the aeration apparatus generally parallel to the shoreline of the pond. This not only produces turbulence and aeration in the water, but also sets up currents along the shoreline tending to drive fish away from the edge of the pond and prevent them from congregating in the shallow water and the consequent further depletion of dissolved oxygen in this area and prevent the fish from beaching themselves in their search for oxygen. At the same time, efficient aeration of water discharged from the secondary outlet openings restores the dissolved oxygen in the pond water to provide emergency relief and avoid fish loss.

An important advantage of the aeration apparatus of the present invention is that it can be quickly moved from one position to another along the shoreline of a pond without substantial loss of aeration time in emergency conditions. This, however, is not always necessary since the water turbulence created from the pump discharge reentering the pond water tends to attract fish to the area where dissolved oxygen is being replenished.

In one embodiment of the apparatus currently being tested, the pump employed is capable of delivering 8,000 gallons of water per minute when operated at 1,000 rpm. A conventional farm tractor is employed to drive the pumping apparatus at the desired speed to deliver this relatively high volume of water without requiring expensive installations or power plants. By discharging water in two primary streams in opposite directions, more efficient use of the pump discharge is achieved, thereby greatly increasing the effectiveness of the apparatus in driving fish from the shallow water portion of the pond back away from the shoreline. In addition, a relatively large volume of water is discharged upwardly in the widely diverging spray pattern to absorb substantial quantities of oxygen.

While a specific embodiment of the invention has been disclosed and described, it is understood that the invention is not restricted solely thereto, but rather it is intended to include all embodiments thereof which would be apparent to one skilled in the art and which come within the spirit and scope of the invention.

I claim:

1. A portable fish pond aeration apparatus comprising, in combination, pump means including a pump housing having a pump inlet and a pump outlet and impeller means mounted for rotation about a fixed axis within the housing, drive means for rotating said impeller means to draw water into the pump inlet and discharge the water from the pump outlet, manifold means connected to said housing to receive water discharged from said outlet, said manifold means including an elongated pipe rigidly mounted at a location above said pump inlet, closure means mounted on each end of said elongated pipe, a pair of primary discharge openings formed one in each said closure means for discharging water from the manifold, said primary discharge openings being arranged to discharge water in generally colinear, oppositely directed streams, a single axle trailer adapted to be towed along the ground by a tractor, said trailer including a frame supporting said pump means and said manifold means, wheel means mounting said frame for movement over the ground, and connecting means for connecting said frame to a tractor for towing, said connecting means including an elongated tongue having one end connected to said frame and projecting forwardly therefrom and having its other end adapted to be connected to the drawbar of a tractor for towing, said manifold means having its longitudinal axis extending generally parallel to the single axis of said trailer, said pump means being operable when positioned in a pond of water adjacent the shoreline with the pump inlet below the water level to discharge said generally colinear streams generally parallel to the shoreline of the pond to aerate the water and to drive fish from the shallow water adjacent the shoreline of the pond in both directions from the pump.

2. The invention defined in claim 1 wherein said drive means comprises an elongated drive shaft having one end connected to said pump impeller and flexible coupling means on its other end for driving connection with the power take-off shaft of a tractor, and bearing means supporting said shaft intermediate its ends and above said elongated tongue.

3. The invention defined in claim 1 further comprising a plurality of secondary outlet openings in said manifold for discharging water in a generally upwardly directed spray simultaneously with discharge of water from said primary outlets.

4. Portable fish pond aeration apparatus comprising, in combination, pump means including a pump housing having pump inlet and pump outlet means and impeller means mounted for rotation about a fixed axis within the housing, drive means for rotating said impeller means to draw water into the pump inlet and discharge the water from the pump outlet, manifold means connected to said housing to receive water discharged from the outlet, said manifold means including an elongated pipe rigidly mounted at a location above said pump inlet, closure means mounted on each end of said elongated pipe, a pair of primary discharge openings formed one in each of said closure means for discharging water from said manifold means, said primary discharge opening being arranged to discharge water in generally colinear oppositely directed streams, carriage means adapted to be towed along the ground by a tractor, said carriage means including a frame supporting said pump means and said manifold means, ground engaging means supporting said frame for movement over the ground, and connecting means including an elongated tongue having one end connected to said frame and projecting forwardly therefrom and having its other end adapted to be connected to the drawbar of a tractor for towing, said pump means being operable when positioned in a pond of water adjacent the shoreline with the pump inlet below the water level to discharge said generally colinear oppositely directed streams generally parallel to the shoreline of the pond to aerate the water and to drive fish from the shallow water adjacent the shoreline of the pond in both directions from the pump.

5. The invention defined in claim 4 wherein said drive means comprises an elongated drive shaft having one end connected to said pump impeller and flexible coupling means on its other end for driving connection with the power take-off shaft of a tractor, and bearing means supporting said shaft intermediate its ends and above said elongated tongue.

6. The invention defined in claim 4 further comprising a plurality of secondary outlet openings in said manifold for discharging water in a generally upwardly directed spray simultaneously with discharge of water from said primary outlets.

* * * * *